United States Patent [19]
Jester et al.

[11] Patent Number: 5,789,042
[45] Date of Patent: Aug. 4, 1998

[54] THIN LCP FILM PROCESS

[75] Inventors: Randy D. Jester, Greer; John A. Penoyer, Greenville, both of S.C.

[73] Assignee: Hoechst Celanese Corporation, Warren, N.J.

[21] Appl. No.: 412,397

[22] Filed: Mar. 28, 1995

[51] Int. Cl.$^6$ ............................................ B23B 9/00
[52] U.S. Cl. ........................... 428/1; 428/480; 428/523; 428/910; 264/171; 264/177.1; 264/177.14; 264/177.17; 264/563; 264/565
[58] Field of Search ........................ 428/1, 910, 480, 428/523; 264/171, 177.1, 177.14, 177.17, 563, 565

[56] References Cited

U.S. PATENT DOCUMENTS

| | | | |
|---|---|---|---|
| 4,161,470 | 7/1979 | Calundann | 524/599 |
| 4,885,196 | 12/1989 | Herrington | 428/36.5 |
| 5,248,530 | 9/1993 | Jester | 428/1 |

FOREIGN PATENT DOCUMENTS

| | | |
|---|---|---|
| 63-031729 | 2/1988 | Japan . |
| 4049026 | 2/1992 | Japan . |
| 4259537 | 9/1992 | Japan . |

OTHER PUBLICATIONS

Database WPI, Sec. Ch, Week 9244, Derwent, Publications Ltd., London,G.B; Class A23, AN 92-360050 XP002006504 & JP.A.04 259 537 (Mitsubishi Petrochemical Co., Ltd. Sep. 1992.

Database WPI, Sec. Ch, Week 8812, Derwent Publications, Ltd., London,G.D.; Class A32, AN 88-080203 XP002006505 & JP.A.63 031 729 (Sumitomo Bakelite KK)), Feb. 1988.

Patent Abstracts of Japan, vol. 012, No. 371 (M-748), 5 Oct. 1988 & JP.A.63 122515 Sekisui Plastics Co. Ltd.), 26 May 1988.

Patent Abstracts of Japan, vol. 012, No. 296 (M-731), 12 Aug. 1988 & JP.A.63 074622 Asahi Chem Ind Co. Ltd.), 5 Apr. 1988.

*Primary Examiner*—Leszek Kiliman
*Attorney, Agent, or Firm*—James L. McGinnis

[57] ABSTRACT

A process for producing LCP films that have improved tear resistance, improved balance of physical properties, and relatively wrinkle-free surfaces. An annular co-extrusion die is used to line the LCP with one or more surface layers of a nonadherent polymer before the LCP becomes shear oriented. The multi-layer tube formed by the co-extrusion is sealed, stretched and cooled by passing it over a sizing mandrel. The tube is slit open into a flat configuration.

15 Claims, 2 Drawing Sheets

THIN LCP FILM PROCESS

BACKGROUND OF THE INVENTION

This invention relates to a process for the production of liquid crystalline polymer films, especially such films having improved tear resistance and wrinkle freedom.

It is well known that certain polymers form so-called liquid crystalline structures. These polymers often exhibit a significant degree of anisotropy or unbalanced orientation. See, e.g., U.S. Pat. No. 4,161,470.

When a liquid crystalline polymer ("LCP") is extruded it typically experiences high shear and becomes oriented in the machine (extrusion) direction, resulting in anisotropic mechanical properties. In particular, the tear strength in the machine direction is much lower than the tear strength in the transverse direction and the tensile strength and modulus are much higher in the machine direction than in the transverse direction.

Thin LCP films produced by blown film (inflation) processes do not exhibit the same high degree of anisotropy, but are prone to severe wrinkling when the tubular bubble is collapsed at the nip line. The transition from the inflated bubble geometry to a flat film geometry turns the smooth blown surface into a wrinkled flat film. This problem is more pronounced for thinner films. Unfortunately, wrinkled films are not acceptable for most applications; ironing/unwrinkling operations may be able to remove wrinkles, but add complexity and cost to the process.

Another problem often encountered with blown films is a lack of uniformity in the thickness of the film. Typical blown film processes result in a film having both thinner and thicker areas due to uneven distribution of the polymer.

SUMMARY OF THE INVENTION

The present invention is a process for producing LCP film that has improved balance of properties, including tensile strength, modulus, and tear resistance, and is relatively wrinkle-free with good flatness, wherein a co-extrusion die is used to line the LCP layer with one or more surface layers of a nonadherent, non-LCP polymer sheath before the LCP can become highly shear oriented. The multi-layer tube formed by the co-extrusion is sealed, stretched, and cooled by passing it over a sizing mandrel. Then the tube is slit open into a flat configuration before reaching a film take-off mechanism such as nip rolls.

The non-adherent polymer sheath reduces shear orientation of the LCP during extrusion through the die, and provides a means for slow, controlled cooling outside the die, generating a wider processing window of plasticity for transverse orientation.

The relatively tough sheath layers ease LCP thread-up and reduce extrusion downtime due to splitting or holes in the LCP layer. This approach provides a means for making very thin LCP films that are too fragile to produce by conventional means.

It is an object of the present invention to provide a method for making improved LCP films.

It is another object of the invention to provide a relatively unwrinkled LCP film having improved flatness.

A further object of this invention is to provide a means for producing an LCP film having a relatively balanced orientation.

Another object of the present invention is to provide a means for forming a flat LCP film that does not have a significant degree of wrinkling.

It is also an object of this invention to provide a means for producing very thin LCP films, e.g., less than one mil thick.

An additional object of the present invention is to provide a process for producing an LCP film that is surface protected from contamination during handling prior to final use.

Yet another object of the invention is to provide a film having a relatively uniform thickness.

These and other objects of the present invention will be apparent to those skilled in the art from the following detailed description and the appended claims.

DETAILED DESCRIPTION OF THE PREFERRED EMBODIMENTS

Figure 1:
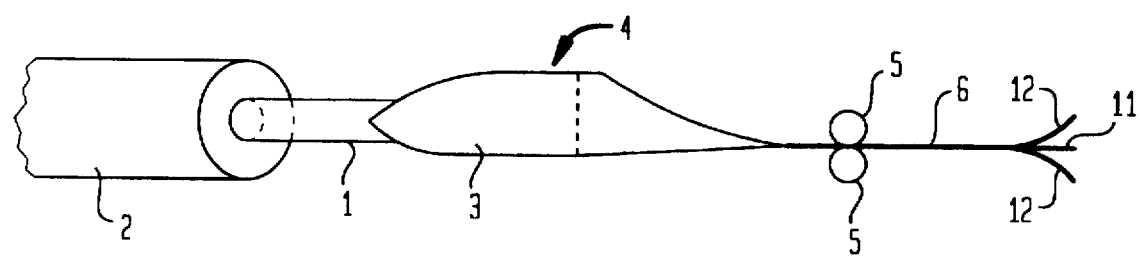
FIG. 1 shows one embodiment of a process according to the present invention.
Figure 1A:
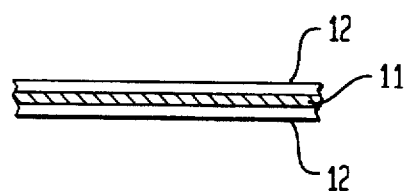
FIG. 1A shows an magnified view of the three layers of the flat film illustrated in FIG. 1.

One preferred embodiment of a process according to the present invention is illustrated in FIG. 1. A multilayer polymer tube 1 having a circular cross-section and comprising a liquid crystalline polymer film layer sheathed by nonadherent, non-LCP polymer layers is extruded from an annular die 2 and then passes over a sizing mandrel 3. A knife 4 slits the tube 1 in advance of the nip rolls 5. This allows the tube 1 to open and form a flat multi-layer polymer sheet or film 6 which passes through the nip rolls 5. Optionally, the film 6 may be separated by peeling the non-LCP layers 12 from the LCP layer 11. FIG. 1A illustrates the arrangement of three polymer layers 11, 12 of the flat film prior to separation.

The mandrel 3 preferably has the same cross-sectional shape, and a larger maximum cross-sectional diameter, than the tube 1 exiting the die 2. Ideally, the minimum diameter of the mandrel 3 is at the first end over which the tube 1 is drawn and the mandrel 3 increases in diameter toward its opposite end. The passage of the tube 1 over the larger mandrel 3 transversely stretches the tube 1 while the LCP is still plastic, prevents film wrinkling, and produces a close, sliding fit between the polymer sheath 1 and the mandrel 3 which facilitates cooling and handling.

The mandrel 3 may comprise means for introducing a gas, to control surface geometry and provide a gas bearing layer between the tube 1 and the surface of the mandrel 3. This gas bearing layer may facilitate the sliding movement of the tube 1 over the mandrel 3.

In another embodiment of the present invention, a second knife may be placed opposite the first knife 4 so that the tube 1 will be split into two smaller flat sheets 6 which may be pulled through separate pairs of nip rolls 5. Additional knives may be used if one wishes to split the polymer sheath into a plurality of strips.

In either of the above-described embodiments, the non-adherent polymer layers may be separated from the LCP film layer immediately after the tube is slit, or may be separated at a later stage to protect the LCP film from abrasion and contamination during handling. The nonadherent protective layers may be removed from the LCP film at any time after the LCP cools.

The process of this invention produces unwrinkled flat LCP films having relatively balanced orientation. The nonadherent polymer layer(s) minimize LCP shear orientation by keeping the LCP surface(s) from contacting the die as it is extruded. After the sheath is extruded, the mandrel stretches it, providing transverse orientation, and prevents wrinkling as the polymers cool.

Figure 2:
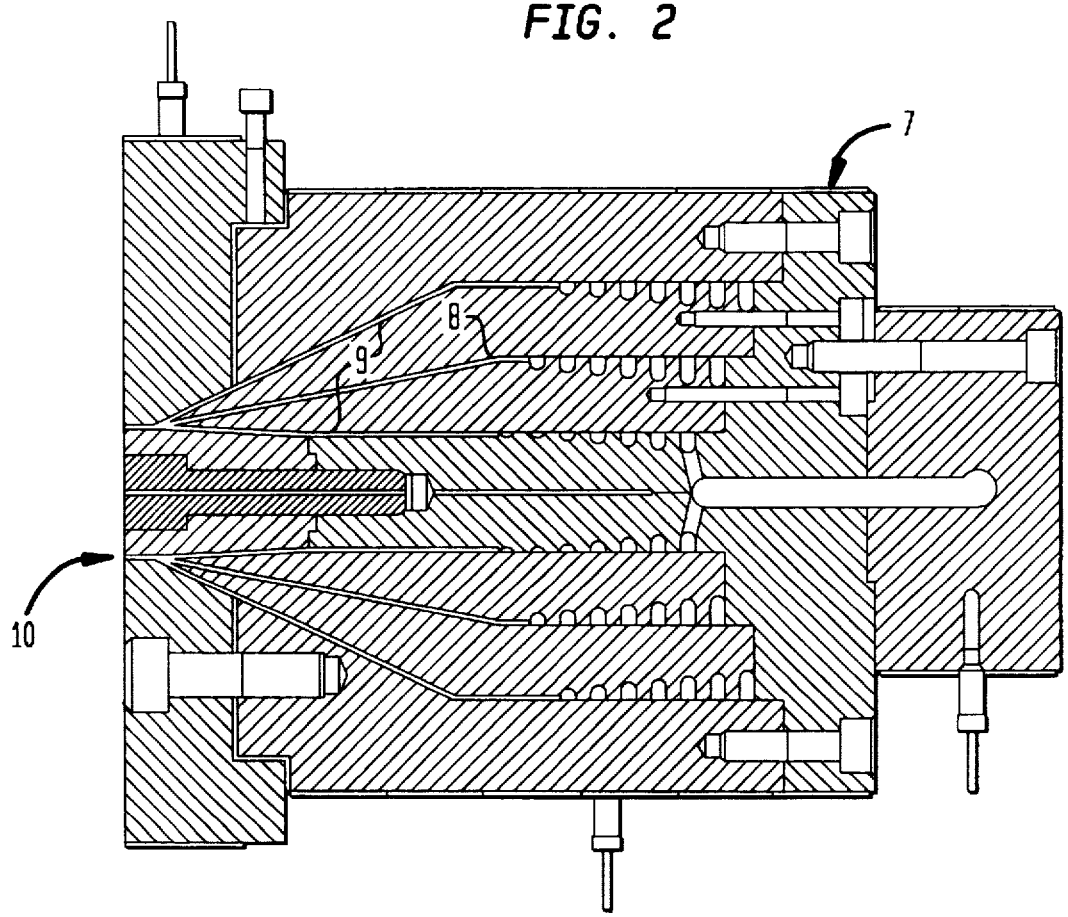
FIG. 2 illustrates a die that may be used in the practice of the present invention.

Coextrusion of a liquid crystalline polymer and one or two concentric layers of nonadherent polymer to form a single multi-layer tube 1 according to the present invention requires the use of a die 7 such as that illustrated in FIG. 2. This die 7 is a three-layer blown film die having three spiral melt flow channels 8 and 9. In the practice of the present invention, the central channel 8 carries the liquid crystalline polymer while the inner and outer channels 9 carry the nonadherent polymer. The flow channels 8 and 9 converge before the die exit end 10. Those skilled in the art will be familiar with other coextrusion dies that may be used in the practice of this invention.

Figure 3:
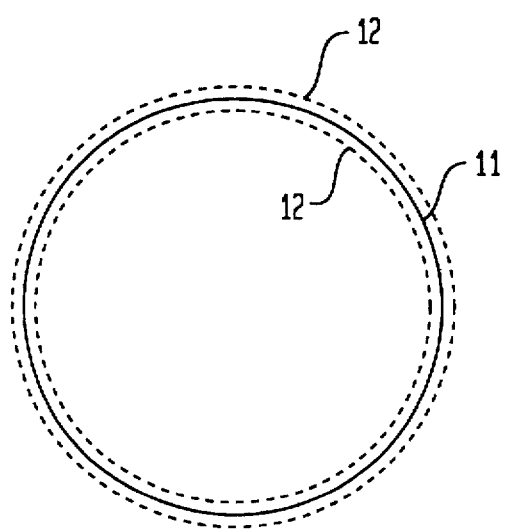
FIG. 3 provides a cross-sectional view of an extruded film tube having an LCP layer located between inner and outer nonadherent polymer layers.

FIG. 3 is a cross-sectional view of a multi-layer film tube 1 having a middle LCP layer 11 and inner and outer nonadherent polymer layers 12.

Although preferred embodiments of this invention involve extruding a tube having a circular cross-section and then passing the tube over a tapered, torpedo-shaped mandrel having a circular cross-section, the diameter of which is larger at its maximum than that of the extruded tube, it is conceivable that a different cross-sectional configuration, e.g. elliptical, may be used without departing from the essence of the invention. It is only necessary that the extruded film tube has a closed perimetric cross-section and a nonadherent polymer as the inner layer of the film perimeter, and that the mandrel is shaped to accommodate the film tube.

Preferably, both the mandrel and film tube (as extruded from the die) are circular in cross-section, and the mandrel is smoothly tapered from a cross-sectional diameter small enough to conveniently accommodate film tube thread-up to a maximum diameter at least 10% greater in diameter than the as-extruded film tube. The maximum size of the mandrel may be much more than 10% greater than the extruded tube, e.g., 25%, 50%, 100%, or more; the maximum mandrel diameter may be chosen based on the desired degree of transverse orientation of the LCP film Of course, the greater the film is stretched, the thinner it becomes; this is another practical consideration that should be taken into account. The main physical limitation to the amount of circumferential film tube stretching is the extent to which the film will stretch without failing, e.g. by splitting or forming holes.

The tube should be passed over the mandrel while the LCP is still in a plastic state to allow the LCP to readily gain, or increase, transverse orientation due to the circumferential stretching of the film over the mandrel. The mandrel essentially provides a stable transverse direction draw ratio. The non-LCP layers provide added toughness to the film tube, and help keep the LCP in a plastic (molten) state for a longer time; these effects significantly ease thread-up around the sizing mandrel.

The term orientation refers herein to the alignment of molecules and crystalline domains in a liquid crystalline polymer. Typically, shear forces acting on an LCP passing through an extrusion die cause machine- or extrusion-direction orientation of LCP molecules and their crystalline domains, with little or no orientation in the transverse direction, i.e. the direction perpendicular to the extrusion direction; this produces very unbalanced film properties. In the present invention, shear orientation is reduced by coextruding an LCP film with one or more non-LCP layers (also referred to herein as nonadherent polymer layers), and transverse orientation in introduced or increased by stretching the LCP film over the mandrel while the LCP is still plastic. The resulting LCP film is more balanced in orientation and, therefore, properties than is a typically extruded LCP film.

The process of the present invention creates wrinkle-free films because the film tube is stretched tightly over a mandrel having the same cross-sectional shape as the extruded film tube, which prevents wrinkling, and the film tube is then slit lengthwise and spread open into a flat sheet. In contrast, blown film is typically collapsed from a bubble to a flat film; that process produces wrinkles.

Any melt extrudable LCP may be used in the practice of this invention. One preferred class of liquid crystalline polymers suitable in the practice of the present invention is aromatic polyesters, such as VECTRA® polyesters (products of Hoechst Celanese Corporation), e.g., VECTRA® A, which comprises 73 mole % of monomer units derived from 4-hydroxybenzoic acid and 27 mole % of monomer units derived from 2,6-hydroxynaphthoic acid (including several different grades, e.g., VECTRA® A910 and VECTRA® A950). Of course, other melt extrudable LCPs are also suitable in the practice of this invention.

The LCP layer film may comprise more than one layer of LCP, which layers may be made of different polymers having different melting points. Such combinations of different liquid crystalline polymers is described in U.S. Pat. No. 5,248,530, the disclosure of which is entirely incorporated herein by reference.

The nonadherent polymer is a non-LCP that preferably has processing characteristics and rheology similar to those of the LCP, and exhibits toughness and ease of handling and processing. The nonadherent polymer should slide smoothly over the surface of the mandrel, so that the film tube may smoothly and easily slide thereover. Also, this polymer desirably has low viscosity to provide lubrication for LCP flow in and through the extrusion die. The term "nonadherent" should not be construed to require a polymer that experiences zero adhesion to surfaces during processing; rather, the nonadherent polymer keeps the LCP from adhering to die and mandrel surfaces, provides improved sliding characteristics to the tube and does not adhere to the LCP after cooling.

Polypropylene and other similar polymers are generally suitable nonadherent polymers in the practice of this invention. Where both an inner layer and an outer layer of nonadherent polymer is used to line the LCP, these two layers may comprise either the same or different nonadherent polymers.

The cooling rate of the film tube depends on several factors, including the thickness of the LCP and nonadherent polymer layers. Variations in the cooling rate can affect LCP film orientation. Therefore, the relative thicknesses of the layers of the tube can be used as a processing parameter to control orientation. The relative thicknesses of the layers is determined by extrusion process parameters and die dimensions. The layers are thinned proportionately as they are stretched over the mandrel, during which stage the LCP film orientation in the transverse direction is increased.

Although nips rolls are used in the illustrated embodiments of the invention, other film take-off mechanisms known in the art may be used. The film take-off mechanism serves several purposes, including: drawing the film over the mandrel; facilitating the opening of the film into a flat configuration after the slitting operation; providing sufficient tension to discourage film wrinkling; and, facilitating the orderly collection of the flat film at the end of the process.

The following non-limiting Example illustrates one embodiment of the present invention.

EXAMPLE

Three extruders were set up to feed polymers into an annular coextrusion die. The die was a two-inch diameter spiral die with an air ring. A sizing mandrel having a four-inch maximum diameter was mounted directly over the die.

Two extruders fed polypropylene into the die and the third fed VECTRA® A910 LCP into the die; the LCP was extruded as the middle layer, and polypropylene was extruded as the inner and outer layers, of a three-layer polymer tube. The relative melt strength of these polymers was sufficiently close that they behaved as a single envelope.

The extruded multi-layer film tube was stretched over the mandrel while still in a molten or plastic state, with air fed through the air ring facilitating sliding of the tube over the mandrel, and threaded through a pull roll system. The mandrel diameter was twice that of the as-extruded tube; hence, as the plastic film tube slid over the mandrel, the film stretched transversely to double its as-extruded size. Before the tube left the mandrel, it was slit lengthwise by a single razor knife. The slit tube was then opened to a flat film form and fed through nip rolls. The polypropylene layers were easily separated from the LCP film layer, and the flat LCP film was wound onto film take-up rolls. The result was a flat, wrinkle-free LCP film having relatively balanced properties.

COMPARATIVE EXAMPLE

The same extruders, die, and polymers were used as in the foregoing Example; however, instead of a sizing mandrel, the three-layer extruded tube was transversely expanded by a conventional blown film technique. During the conventional blown film bubble collapsing step, the LCP film was unavoidably and severely wrinkled.

Those skilled in the art will appreciate that many variations of the present invention are possible without departing from the spirit of the invention. The scope of the present invention is not limited to those embodiments illustrated or described above, but encompasses all the subject matter within the boundaries of the appended claims.

I claim:

1. A process for making a wrinkle-free flat film of liquid crystalline polymer comprising the steps of:

extruding a film tube comprising a first layer of liquid crystalline polymer and a second layer of a non-liquid crystalline polymer, said film tube having a closed perimetric cross-section wherein said second layer forms the inner surface of the perimeter;

sliding said film tube over a mandrel so that said mandrel is enveloped within said second layer, said mandrel having a cross-section of essentially the same shape and a larger maximum cross-sectional diameter than said film tube to stretch said film tube and keep said film tube unwrinkled; and, slitting said tube lengthwise at one or more points on said perimeter so that said tube is opened to form a flat film.

2. A process according to claim 1 further comprising the steps of:

drawing said flat film through a film take-off means; and, removing the non-liquid crystalline polymer layer from the liquid crystalline polymer film layer.

3. A process according to claim 2 wherein said film take-off means comprises nip rolls.

4. A process according to claim 1 further wherein said tube further comprises a third polymer layer adjacent to said first layer, wherein said third layer forms the outer surface of the perimeter of said tube.

5. A process according to claim 4 wherein said cross-section of said film tube is circular.

6. A process according to claim 1 wherein said film tube has a circular cross-section.

7. A process according to claim 6 wherein said mandrel has a circular cross-section that is at least 10% larger in diameter at its maximum than the inner diameter of said film tube prior to being stretched over said mandrel, and further wherein said tube is stretched over said mandrel while said liquid crystalline polymer is in a plastic state to effect transverse orientation of said liquid crystalline polymer layer.

8. A process for making a wrinkle-free flat film of liquid crystalline polymer comprising the following steps performed in the following order:

extruding a film tube comprising a middle layer of liquid crystalline polymer, an inner layer of non-liquid crystalline polymer, and an outer layer of a non-liquid crystalline polymer, said film tube having a circular cross-section;

sliding said film tube over a mandrel so that said mandrel is enveloped within said inner layer, said mandrel having a circular cross-section the maximum diameter of which is greater than the diameter of said inner layer, to stretch said film tube circumferentially and provide transverse orientation to the liquid crystalline polymer layer;

slitting said stretched tube lengthwise so that said tube is opened to form a flat film; and drawing said flat film through nip rolls.

9. A process according to claim 8 wherein said tube is slit lengthwise at more than one point to form more than one flat film section.

10. A process according to claim 9 wherein said flat film sections are drawn through pairs of nip rolls, a separate pair of nip rolls dedicated to drawing each individual flat film section.

11. A process according to claim 8 wherein said inner and outer polymer layers both comprise polypropylene.

12. A process according to claim 8 further comprising the step of separating said layers of said flat film.

13. A process according to claim 8 wherein said middle layer comprises at least two sublayers including a first sublayer made of a first liquid crystalline polymer and a second sublayer made of a second liquid crystalline polymer, wherein said first and second liquid crystalline polymers have different melting points.

14. A wrinkle-free film comprising two liquid crystalline polymers, wherein said film is made according to the process set forth in claim 13.

15. A wrinkle-free film comprising a liquid crystalline polymer, wherein said film is made according to the process set forth in claim 8.

* * * * *